United States Patent
Ueno

(10) Patent No.: US 11,177,930 B2
(45) Date of Patent: Nov. 16, 2021

(54) COMMUNICATION DEVICE, COMMUNICATION SYSTEM, AND SYNCHRONIZATION CONTROL METHOD

(71) Applicant: Mitsubishi Electric Corporation, Tokyo (JP)

(72) Inventor: Toshiaki Ueno, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/973,428

(22) PCT Filed: Jul. 23, 2018

(86) PCT No.: PCT/JP2018/027500
§ 371 (c)(1),
(2) Date: Dec. 9, 2020

(87) PCT Pub. No.: WO2020/021597
PCT Pub. Date: Jan. 30, 2020

(65) Prior Publication Data
US 2021/0250160 A1   Aug. 12, 2021

(51) Int. Cl.
*H04L 7/00* (2006.01)
*G05B 13/02* (2006.01)
*H04L 12/40* (2006.01)

(52) U.S. Cl.
CPC .......... *H04L 7/0008* (2013.01); *G05B 13/026* (2013.01); *H04L 12/40* (2013.01)

(58) Field of Classification Search
CPC ..... H04L 12/40; H04L 7/0008; H04L 7/0012; H04L 7/18513; H04L 7/04; H04L 43/087; H04L 69/324; H04J 3/0667
See application file for complete search history.

(56) References Cited

U.S. PATENT DOCUMENTS

2013/0336341 A1* 12/2013 Kamada ................ H04J 3/0667
                                                      370/503
2015/0180598 A1   6/2015 Arakawa
(Continued)

FOREIGN PATENT DOCUMENTS

JP   2015-130613 A   7/2015
JP   2016-220155 A   12/2016
(Continued)

OTHER PUBLICATIONS

International Search Report and Written Opinion dated Sep. 18, 2018, received for PCT Application No. PCT/JP2018/027500, filed on Jul. 23, 2018, 8 pages including English Translation.
(Continued)

*Primary Examiner* — Jamal Javaid
(74) *Attorney, Agent, or Firm* — Xsensus LLP

(57) ABSTRACT

A communication device 2 according to the present disclosure includes (i) a synchronization signal receiver 203 to receive a synchronization signal from a master device 1 that has a reference time and transmits the synchronization signal every synchronization period, (ii) a synchronization signal determiner 210 to determine whether the synchronization signal is normal or abnormal, (iii) a synchronization processor 211 to perform, when the synchronization signal is determined to be normal by the synchronization signal determiner, synchronization processing based on the synchronization signal determined to be normal, and (iv) an additional transmission requester 214 to request the master device to additionally transmit the synchronization signal before transmitting the synchronization signal during a next period when the synchronization signal is determined to be abnormal by the synchronization signal determiner.

7 Claims, 8 Drawing Sheets

(56) References Cited

U.S. PATENT DOCUMENTS

2015/0188691 A1* 7/2015 Mizuguchi ......... H04B 7/18513
　　　　　　　　　　　　　　　　　　　　　　375/355
2017/0373821 A1* 12/2017 Arakawa ................. G06F 13/42

FOREIGN PATENT DOCUMENTS

| WO | 2012/118178 A1 | 9/2012 |
| WO | 2014/020726 A1 | 2/2014 |
| WO | 2014/083640 A1 | 6/2014 |
| WO | 2016/147405 A1 | 9/2016 |

OTHER PUBLICATIONS

Notice of Reasons for Refusal received for Japanese Patent Application No. 2019-537418, dated Aug. 6, 2019, 4 pages with English Translation.

Decision to Grant a Patent received for Japanese Patent Application No. 2019-537418, dated Oct. 8, 2019, 5 pages with English Translation.

Office Action dated Sep. 14, 2021, in corresponding German patent Application No. 11 2018 007 743.8, 8 pages.

* cited by examiner

COMMUNICATION DEVICE, COMMUNICATION SYSTEM, AND SYNCHRONIZATION CONTROL METHOD

CROSS-REFERENCE TO RELATED APPLICATION

The present application is based on PCT filing PCT/JP2018/027500, filed Jul. 23, 2018, the entire contents of which are incorporated herein by reference.

TECHNICAL FIELD

The present disclosure relates to a communication device, a communication system and a synchronization control method.

BACKGROUND ART

In a production line of a factory, due to the need for devices to operate in cooperation with one another, the devices are made to have a common time, and each device is made to operate based on the common time. The devices are connected to one another by a network, and a process for making the devices have the common time through the network (synchronization process) is performed.

In a conventional communication device, synchronization is performed by transmitting and receiving a synchronization packet between communication devices at regular intervals, and in order that synchronization timing is not disturbed by a synchronization packet received for some reason at a timing other than the timing of reception of the synchronized packet at the regular intervals, the conventional communication device includes a filter that rejects the synchronization packet received at the timing other than that of the regular intervals (for example, refer to paragraph 0027 of Patent Literature 1).

CITATION LIST

Patent Literature

Patent Literature 1: International Publication No. WO 2014/020726

SUMMARY OF INVENTION

Technical Problem

In the above-described conventional communication device, when a synchronization packet is received at the abnormal timing other than the timing of reception of the synchronization packet at the regular intervals, the abnormal synchronization packet is rejected and no synchronization process is performed. Accordingly, the above-described conventional communication device has a problem in that the conventional communication device must wait for next reception of a synchronization packet at the regular intervals, and a state in which synchronization is not performed is prolonged.

In order to solve the aforementioned problem, an objective of the present disclosure is to obtain a communication device, a communication system and a synchronization control method that are capable of quickly performing synchronization.

Solution to Problem

A communication device according to the present disclosure includes (i) a synchronization signal receiver to receive a synchronization signal from a master device that has a reference time and transmits the synchronization signal every synchronization period, (ii) a synchronization signal determiner to determine whether the synchronization signal is normal or abnormal, (iii) a synchronization processor to perform, when the synchronization signal is determined to be normal by the synchronization signal determiner, synchronization processing based on the synchronization signal determined to be normal, and (iv) an additional transmission requester to request, when the synchronization signal is determined to be abnormal by the synchronization signal determiner, the master device to additionally transmit the synchronization signal before transmitting the synchronization signal during a next period.

A communication system according to the present disclosure is a communication system in which a master device and a slave device are connected via a communication line, wherein the master device includes (i) a master clock to generate a reference time, and (ii) a synchronization signal transmitter to: transmit every synchronization period a synchronization signal, the synchronization signal causing the slave device to execute synchronization with the reference time; and perform additional transmission of the synchronization signal before transmission of the synchronization signal during a next period upon receiving a request from the slave device, and the slave device includes (i) a slave clock to generate a slave time, (ii) a synchronization signal receiver to receive the synchronization signal from the master device, (iii) a synchronization period storage to store the synchronization period, (iv) a synchronization signal determiner to determine whether the synchronization signal is normal or abnormal, (v) a synchronization processor to perform, when the synchronization signal is determined to be normal by the synchronization signal determiner, synchronization processing for synchronizing the slave time with the reference time based on the synchronization signal determined to be normal, and (vi) an additional transmission requester to request the master device to additionally transmit the synchronization signal within a current period when the synchronization signal is determined to be abnormal by the synchronization signal determiner.

A synchronization control method according to the present disclosure includes (i) periodically transmitting a synchronization signal by a master device that has a reference time, (ii) receiving the synchronization signal by a slave device, (iii) determining whether the synchronization signal received by the slave device is normal or abnormal, (iv) upon determining that the synchronization signal is normal, performing synchronization processing by the slave device based on the synchronization signal determined to be normal, (v) upon determining that the synchronization signal is abnormal, making, by the slave device, a request for the master device to additionally transmit the synchronization signal before transmission of the synchronization signal during a next period, and (vi) additionally transmitting the synchronization signal within a current period by the master device based on the request from the slave device.

Advantageous Effects of Invention

The communication device, the communication system, and the synchronization control method according to the present disclosure are configured to: determine whether a synchronization signal is normal or abnormal; and request, when the synchronization signal is abnormal, additional transmission of the synchronization signal based on a result of the determination without waiting for the next period for transmission of the synchronization signal, thereby having an effect of enabling quick synchronization even when there is abnormality in the synchronization signal.

DESCRIPTION OF EMBODIMENTS

A communication device, a communication system and a synchronization control method according to an embodiment of the present disclosure are described below in detail with reference to drawings. However, the present disclosure is not limited to this embodiment.

Embodiment

Figure 1:
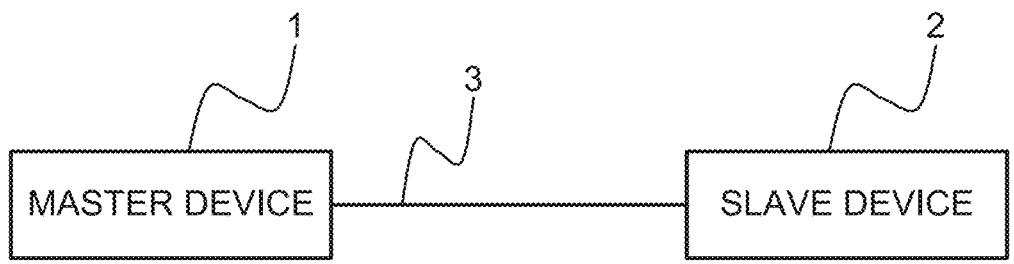
FIG. 1 is a view illustrating an example of a configuration of a communication system according to an embodiment of the present disclosure.

FIG. 1 is a view illustrating an example of a configuration of a communication system according to an embodiment of the present disclosure. In the communication system illustrated in FIG. 1, a master device 1 and a slave device 2, both of which are communication devices, are connected via a network (communication line) 3. The network 3 is, for example, an industrial network. The master device 1 is a node device having a reference time, and the slave device 2 is a node device that generates, based on a communication frame from the master device 1, a time with a small difference from the reference time. The master device 1 and the slave device 2 are both network units, and are connected to other devices such as a motion controller via a non-illustrated system bus. Configurations of the master device 1 and the slave device 2 are described later.

Figure 2:
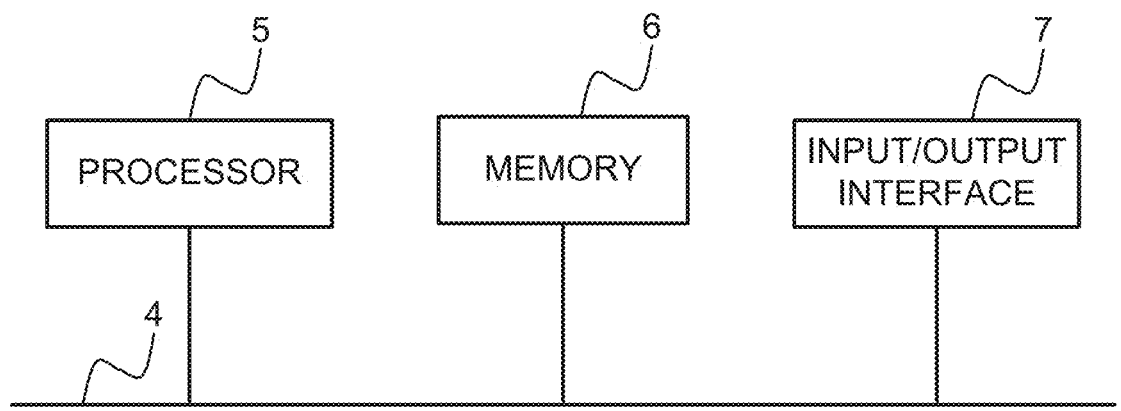
FIG. 2 is a view illustrating an example of a configuration of hardware of a communication device according to the embodiment of the present disclosure.

Here, a configuration of hardware for achieving the communication device according to the embodiment of the present disclosure is described. FIG. 2 is a view illustrating an example of a configuration of hardware of the communication device according to the embodiment of the present disclosure. The master device 1 and the slave device 2 can each be achieved with a similar configuration of hardware. Since the master device 1 and the slave device 2 are separate devices, these devices 1 and 2 may be different from each other in detailed configuration of hardware.

The communication device can be achieved by (i) a processor 5, (ii) a memory 6 including a random access memory (RAM), a read only memory (ROM) and the like, and (iii) an input/output interface 7 for connecting to various networks. The processor 5, the memory 6, and the input/output interface 7 are connected to a bus 4, and can exchange data, control information, and the like with one another via the bus 4.

A program for communication is stored in the memory 6 in advance, and the processor 5 executes the program, thereby executing various types of processes of the communication device. Communication between the communication devices is achieved by the input/output interface 7. Also, a plurality of processors and a plurality of memories may be made to cooperate with one another to achieve each component of the communication device.

Figure 3:
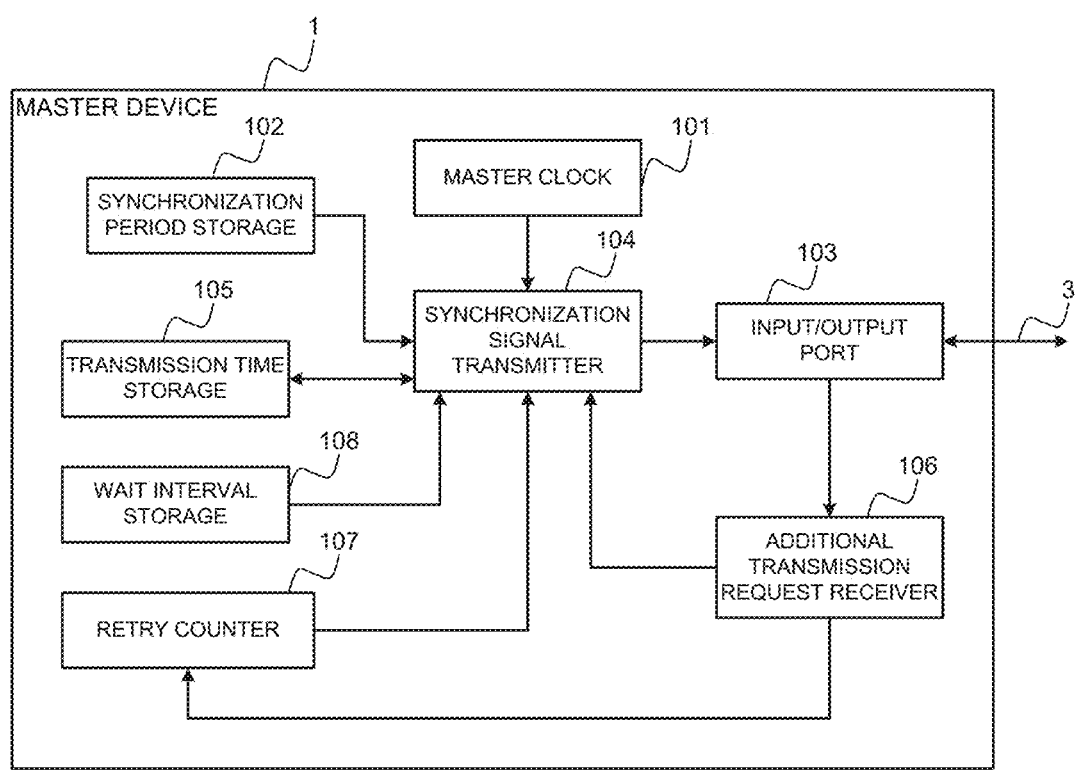
FIG. 3 is a block diagram illustrating an example of a configuration of a communication device (master device) according to the embodiment of the present disclosure.

Next, a configuration of the master device 1 is described with reference to FIG. 3. The master device 1 includes a master clock 101, a synchronization period storage 102, an input/output port 103, a synchronization signal transmitter 104, a transmission time storage 105, an additional transmission request receiver 106, a retry counter 107, and a wait interval storage 108.

The master clock 101 generates a reference time in the communication system according to the embodiment of the present disclosure. The synchronization period storage 102 stores a period (synchronization period) T for the master device 1 to periodically transmit, to the slave device 2, a synchronization frame that is a synchronization signal. The input/output port 103 relays exchange of various types of frames between each component of the master device 1 and the slave device 2. The additional transmission request receiver 106 requests the synchronization signal transmitter 104 to additionally transmit a synchronization frame for a retry (retry frame) upon receiving a request (retry request) for additional transmission of the synchronization frame from the slave device 2. The retry counter 107 counts the number of times (number of retries) n that the additional transmission request receiver 106 receives the retry request. The wait interval storage 108 stores a time interval (wait interval) R at which the synchronization signal transmitter 104 transmits the synchronization frame for a retry. The synchronization signal transmitter 104 generates a synchronization frame based on a synchronization protocol such as IEEE 1588 or IEEE 802.1AS, and transmits the generated synchronization frame to the slave device 2 via the input/output port 103. Timing at which the synchronization signal transmitter 104 transmits a synchronization frame is described later. The transmission time storage 105 stores a time at which the synchronization signal transmitter 104 transmits a periodic synchronization frame based on the period T.

Each of functions of the master clock 101, the synchronization signal transmitter 104, the additional transmission request receiver 106, and the retry counter 107 is achieved by the processor 5 executing a software module for achieving each function, the software module being stored in the memory 6. Multiple functions among the above-described functions may be achieved by executing a single software module by the processor 5. Functions of the input/output port 103 are achieved by the input/output interface 7. Each of functions of the synchronization period storage 102, the transmission time storage 105, and the wait interval storage 108 is achieved by a storage area of the memory 6. A user sets (i) the synchronization period T stored in the synchronization period storage 102 and (ii) the wait interval R stored in the wait interval storage 108. The synchronization period T may be determined in consideration of (i) required accuracy of synchronization between the master device 1 and the slave device 2 and (ii) a degree of occurrence of a difference in time between the master device 1 and the slave device 2. Also, the wait interval R may be determined in consideration of a time period during which communication between the master device 1 and the slave device 2 is performed. In the present embodiment, a synchronization accuracy of ±1 μsec is required, and the synchronization period T is 10 msec. Also, the wait interval R is 100 μsec. However, the synchronization period T and the wait interval R need not always be fixed values but may be variable values that are changed in accordance with conditions.

Next, the timing at which the synchronization signal transmitter 104 transmits the synchronization frame is described. The synchronization signal transmitter 104 transmits the synchronization frames at intervals each of which is equal to the synchronization period T set in advance, and additionally transmits the synchronization frame for a retry upon receiving the retry request from the slave device 2. The synchronization frame for a retry is transmitted by the synchronization signal transmitter 104 at a timing obtained by adding, to the transmission time of the synchronization frame stored in the transmission time storage 105, a period obtained by multiplying the wait interval R stored in the wait interval storage 108 by the number of retries n stored in the retry counter 107.

Figure 4:
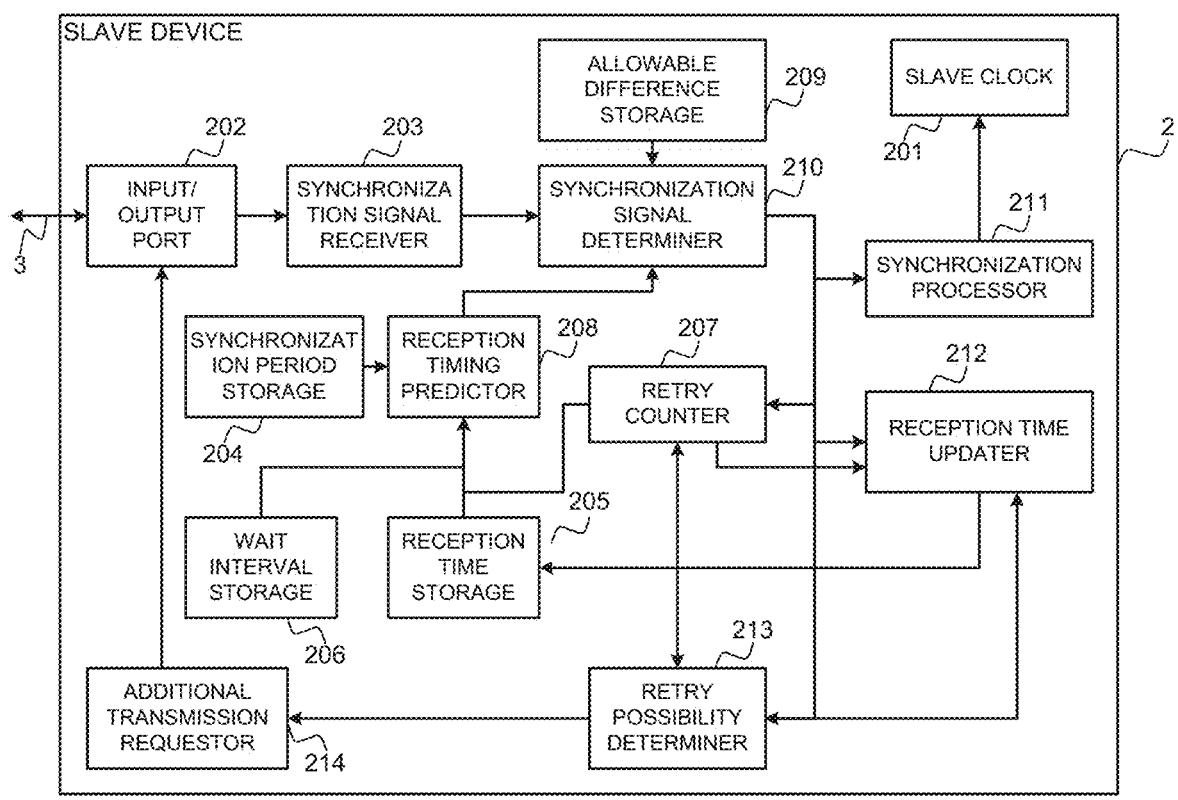
FIG. 4 is a block diagram illustrating an example of a configuration of a communication device (slave device) according to the embodiment of the present disclosure.

A configuration of the slave device 2 is described with reference to FIG. 4. The slave device 2 includes a slave clock 201, an input/output port 202, a synchronization signal receiver 203, a synchronization period storage 204, a reception time storage 205, a wait interval storage 206, a retry counter 207, a reception timing predictor 208, an allowable difference storage 209, a synchronization signal determiner 210, a synchronization processor 211, a reception time updater 212, a retry possibility determiner 213, and an additional transmission requestor 214.

The slave clock 201 generates a slave time in the slave device 2. The input/output port 202 relays exchange of various types of frames between each component of the slave device 2 and the master device 1. The synchronization signal receiver 203 receives the synchronization frame transmitted from the master device 1. The synchronization period storage 204 stores the period (synchronization period) T of transmission of the synchronization frame from the master device 1 to the slave device 2. The synchronization period T has the same value as the synchronization period T stored in the synchronization period storage 102 of the master device 1, and the master device 1 and the slave device 2 share the synchronization period T. The reception time storage 205 stores a time (previous reception time) at which the synchronization signal receiver 203 periodically receives the synchronization frame with the synchronization period T. The wait interval storage 206 stores the time interval (wait interval) R when the synchronization signal transmitter 104 transmits the synchronization frame for a retry. The wait interval R has the same value as the wait interval R stored in the wait interval storage 108 of the master device 1, and the master device 1 and the slave device 2 share the wait interval R. The retry counter 207 counts the number of times (number of retries) n that the retry request is transmitted to the master device 1. The reception timing predictor 208 calculates a timing at which the synchronization signal receiver 203 is predicted to receive a next synchronization frame, this timing being referred to as "reception prediction timing" hereinafter. The allowable difference storage 209 stores an allowable difference δ of a delay of the frame propagation. Based on a difference between (i) the time at which the synchronization signal receiver 203 receives the synchronization frame and (ii) the reception prediction timing calculated in advance by the reception timing predictor 208, the synchronization signal determiner 210 determines whether the received synchronization frame is normal. The synchronization processor 211 corrects the slave time of the slave clock 201 based on the synchronization frame determined to be normal by the synchronization signal determiner 210 (that is, the synchronization processor 211 performs synchronization processing). The reception time updater 212 updates the reception time (previous reception time) of the synchronization frame stored in the reception time storage 205. On the other hand, the synchronization frame determined not to be normal is discarded, and the synchronization processor 211 does not perform synchronization processing based on the discarded synchronization frame. When the synchronization signal determiner 210 determines that the synchronization frame is not normal, the retry possibility determiner 213 determines whether a retry of the synchronization processing is possible based on whether there is time to retry the synchronization processing by the timing at which a next periodic synchronization processing is performed, that is, within the current period. When the retry possibility determiner 213 determines that there is time to retry synchronization processing (that is, the retry is possible), the additional transmission requester 214 generates a communication frame (retry request) storing information indicating a request for additional transmission and transmits the generated communication frame to the master device 1 via the input/output port 202. Also, the synchronization processing in the synchronization processor 211 is performed based on a synchronization protocol such as IEEE 1588 or IEEE 802.1AS.

Each of functions of the slave clock 201, the synchronization signal receiver 203, the retry counter 207, the reception timing predictor 208, the synchronization signal determiner 210, the synchronization processor 211, the reception time updater 212, the retry possibility determiner 213, and the additional transmission requester 214 is achieved by executing, by the processor 5, a software module stored in the memory 6. Two or more functions among the above-described functions may be achieved by executing a single software module by the processor 5. Functions of the input/output port 202 are achieved by the input/output interface 7. Each of functions of the synchronization period storage 204, the reception time storage 205, the wait interval storage 206, and the allowable difference storage 209 is achieved by a storage area of the memory 6. The user sets the synchronization period T stored in the synchronization period storage 204, the wait interval R stored in the wait interval storage 206, and the allowable difference δ stored in the allowable difference storage 209. The allowable difference δ may be determined based on required accuracy of synchronization between the master device 1 and the slave device 2. In the present embodiment, the allowable difference δ is 1 μsec in order to satisfy synchronization accuracy of ±1 pec. However, the allowable difference δ need not always be a fixed value and may be a variable value that is changed in accordance with conditions.

Next, the calculation of the reception prediction timing in the reception timing predictor 208 is described. As described above, the times (previous reception times) at which the synchronization signal receiver 203 periodically receives the synchronization frames with the synchronization period T are stored in the reception time storage 205. The reception timing predictor 208 calculates, as the reception prediction timing, a timing obtained by adding, to the previous reception time, the synchronization period T stored in the synchronization period storage 204. The calculation of the reception prediction timing is not performed if the previous reception time is not stored, for example, when the synchronization signal is received for the first time.

The synchronization signal determiner 210 determines whether a newly received synchronization frame is normal. The magnitude of the difference between the timing at which the synchronization signal receiver 203 newly receives the synchronization frame and the reception prediction timing calculated by the reception timing predictor 208 is used for this determination. The determination of the received synchronization frame is performed based on whether the magnitude of the difference is equal to or less than the allowable difference δ stored in the allowable difference storage 209 as a reference value for the determination. If the magnitude of the difference is equal to or less than the allowable difference, the synchronization frame is determined to be normal. On the other hand, if the magnitude of the difference is greater than the allowable difference, the synchronization frame is determined to be abnormal. In some cases including a case in which the synchronization frame is lost, the synchronization signal receiver 203 may not be able to receive the synchronization frame. Accordingly, if the synchronization signal receiver 203 does not receive the synchronization frame when a time period equal to the allowable difference δ elapses from the reception prediction time, the synchronization signal determiner 210 determines that the synchronization frame is abnormal. Also, when the reception timing predictor 208 does not calculate the reception prediction timing, the synchronization signal determiner 210 determines that the received synchronization frame is normal.

In the present embodiment, the determination is made as to whether the synchronization frame is normal using as a reference a time (previous reception time) at which the synchronization frame is normally received previously, the time being stored in the reception time storage 205. Accordingly, when the reference previous reception time is not appropriate, the determination is not performed correctly, and the determination that the synchronization signal is abnormal is considered to be repeatedly and continuously made even though the synchronization signal is normal. In order to address such a problem, when the number of retries reaches a set upper limit, the slave device 2 may be configured to operate such that the slave device 2 does not make a retry request and regards, as a normal synchronization signal, a synchronization signal received in the next synchronization period, performs the synchronization processing, and updates the synchronization frame reception time (previous reception time).

A value of the allowable difference δ is input by, for example, the user using the present system. For example, when the synchronization accuracy target is increased, the value of the allowable difference δ is set low, and when lowering the synchronization accuracy is permissible, the value of the allowable difference δ is set high. If the determination that the synchronization signal is abnormal continues, the time at which the previous synchronization frame is received normally (previous reception time), which is stored in the reception time storage 205, might not be valid, and thus the value of the allowable difference δ is temporarily increased to prompt the synchronization processing, and when the determination that the synchronization signal is normal continues, the value of the allowable difference δ may be reduced.

If the synchronization signal determiner 210 determines that the synchronization frame is normal and the synchronization frame is not a synchronization frame based on a retry request (a count value of the retry counter 207 is 0), the reception time updater 212 updates, to a reception time of the synchronization frame that is newly determined to be normal, the time (previous reception time) stored in the reception time storage 205. On the other hand, when (i) the synchronization frame is determined to be normal by the synchronization signal determiner 210 and the synchronization frame is a synchronization frame based on a retry request (the count value of the retry counter 207 is not 0) or (ii) the retry possibility determiner 213 determines that there is no time to execute the retry, the retry possibility determiner 213 regards, as a time at which the synchronization signal is periodically received, a time obtained by adding the period T to the originally-stored time (previous reception time), and the time (previous reception time) stored in the reception time storage 205 is updated based on this time.

The retry possibility determiner 213 determines, based on whether there is time to retry the synchronization processing by a time of a next periodic synchronization processing, that is, within the current period, whether a retry of the synchronization processing is possible. The determination as to whether there is time to retry the synchronization processing is made based on whether a calculated value, which is obtained by (i) multiplying the wait interval R by a number that is obtained by adding 1 to the number of retries n and (ii) adding the allowable difference δ to a value obtained by the multiplication, is less than the synchronization period T. If the calculated value is less than the synchronization period T, the retry possibility determiner 213 determines that there is a time to perform a retry (that is, the retry is possible), and if the calculated value is not less than the synchronization period T, the retry possibility determiner 213 determines that there is no retry execution time (no retry is possible). The maximum number of times that the synchronization processing can be retried during one period may be calculated in advance, and determination as to whether a retry of the synchronization processing is possible may be made based on the number of retries n stored in the retry counter 207. On the basis of the synchronization period T, the wait interval R, and the number of retries n, determination as to whether there is a time to perform a retry (that is the retry is possible) can be made in the slave device, thereby omitting unnecessary communication and reducing the load on the master device.

Figure 5:
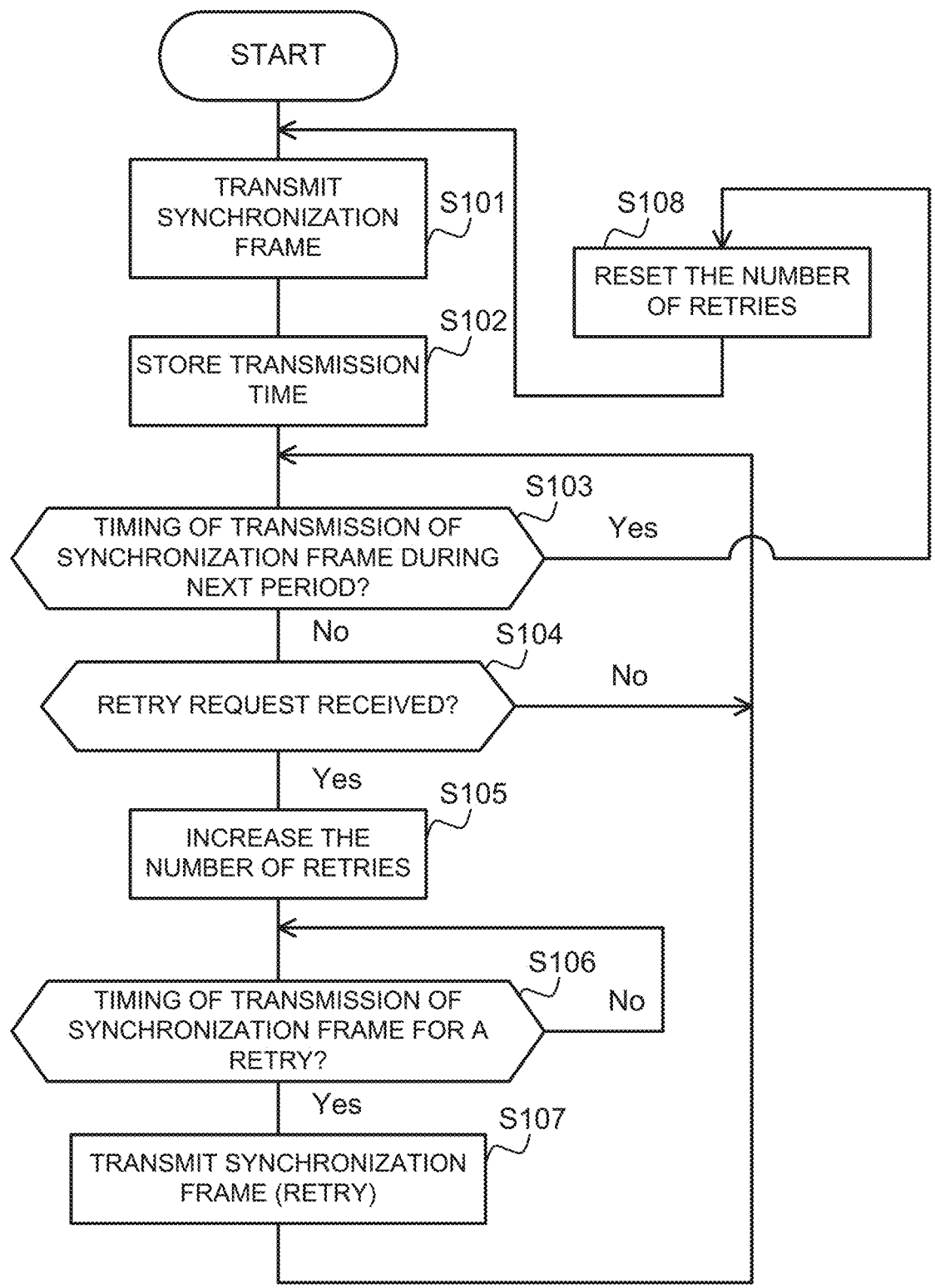
FIG. 5 is a flow chart illustrating processing in the communication device (master device) according to the embodiment of the present disclosure.

Next, processing in the master device 1 is described with reference to the flowchart of FIG. 5. First, the synchronization signal transmitter 104 of the master device 1 transmits a synchronization frame (S101), and stores a time of the transmission of the synchronization frame in the transmission time storage 105 (S102). Next, the synchronization signal transmitter 104 determines whether the current time reaches a time of next transmission of the synchronization frame, that is, a next synchronization frame transmission time during a next period (S103). The time of transmission of the next synchronization frame used for this determination is a time obtained by adding, to the transmission time stored in the transmission time storage 105, the synchronization period T stored in the synchronization period storage 102.

When the current time does not reach the next synchronization frame transmission time (No in S103), the additional transmission request receiver 106 determines whether a retry request is received from the slave device 2 (S104).

On the other hand, when the current time reaches the next synchronization frame transmission time (Yes in S103), the retry counter 107 resets the number of retries (that is, sets the number of retries to 0) (S108), and the synchronization signal transmitter 104 transmits the synchronization frame during the next period (that is, the processing returns to S101).

If determination that a retry request is not received from the slave device 2 is made in step S104, the processing returns to step S103. As a result of steps S103 and S104, the master device 1 waits for reception of a retry request until the time of transmission of the next synchronization frame comes.

On the other hand, in step S104, when the additional transmission request receiver 106 receives a retry request from the slave device 2, the retry counter 107 increases the number of retries by one (S105). After waiting until a time of transmission of a synchronization frame for a retry comes (S106), the synchronization signal transmitter 104 transmits the synchronization frame for a retry (S107), and the processing returns to step S103. The time of the transmission of the synchronization frame for a retry used in step S106 is a time obtained by (i) multiplying the wait interval R stored in the wait interval storage 108 by the number of retries n stored in the retry counter 107 and (ii) adding the value obtained by the multiplication to the transmission time stored in the transmission time storage 105.

Figure 6:
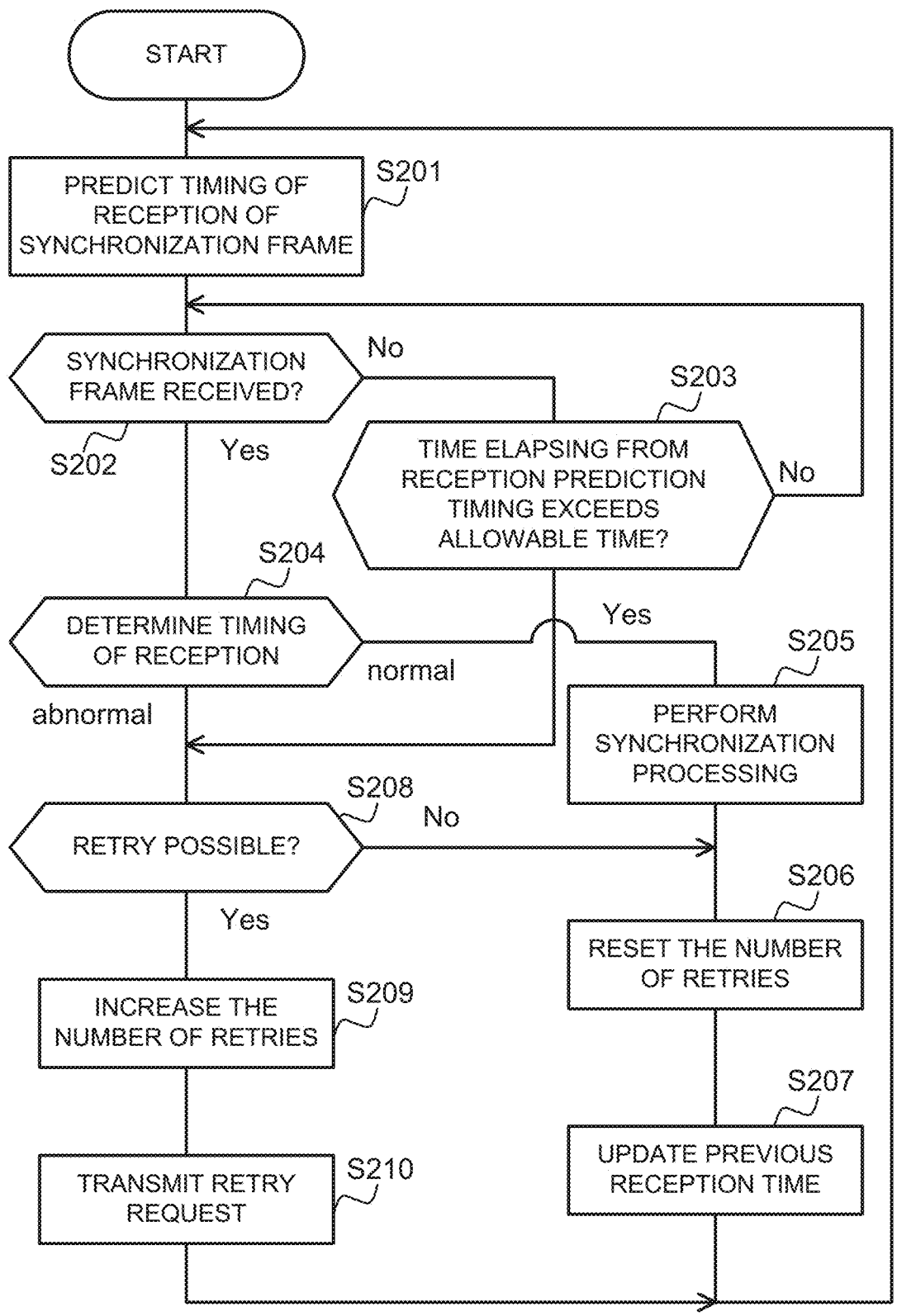
FIG. 6 is a flow chart illustrating processing in the communication device (slave device) according to the embodiment of the present disclosure.

Processing in the slave device 2 is described with reference to the flowchart of FIG. 6. First, the reception timing predictor 208 calculates the reception prediction timing of the synchronization frame (S201). Specifically, by (i) multiplying the wait interval R stored in the wait interval storage 206 by the number of retries n stored in the retry counter 207 and (ii) adding, to the time stored in the reception time storage 205 (previous reception time), the synchronization period T stored in the synchronization period storage 204 and the value obtained by the multiplication, the reception prediction timing of the synchronization frame is calculated. Here, the reception prediction timing is based on the time generated by the slave clock 201 and is calculated as time information. The reception prediction timing has only to be able to be specified using as a reference the time generated by the slave clock 201. For example, the reception prediction timing may be represented by data such as the count number by the reference clock of the slave device 2 from the previous reception time.

Next, the synchronization signal receiver 203 determines whether the synchronization frame is received (S202). When the synchronization signal receiver 203 receives the synchronization frame (Yes in S202), the synchronization signal determiner 210 determines timing of the reception of the synchronization frame (S204). The method of determining the synchronization frame by the synchronization signal determiner 210 is as described above, and the synchronization signal determiner determines, based on the reception timing, whether the synchronization frame is normal or abnormal. On the other hand, when the synchronization signal receiver 203 does not receive the synchronization frame (No in S202), the synchronization signal determiner 210 determines whether the allowable time δ elapses from the reception prediction timing of the synchronization frame (S203). Here, in a state where the synchronization signal receiver 203 does not receive the synchronization frame, when the current time is a time at which the allowable time δ elapses from the reception prediction timing (Yes in S203), the synchronization signal determiner 210 determines that the synchronization frame is abnormal.

In step S204, when the synchronization signal determiner 210 determines that the synchronization frame is normal (when the determination in S204 is "normal"), the synchronization processor 211 performs synchronization processing of the slave clock 201 based on the received synchronization frame (S205). Afterward, the retry counter 207 resets the number of retries n (that is, sets the number of retries to 0) (S206), and the reception time updater 212 updates the time of reception of the synchronization frame (previous reception time) stored in the reception time storage 205 (S207). Thereafter, the processing returns to step (S201) of calculating the reception prediction timing of the synchronization frame.

On the other hand, when the synchronization signal determiner 210 determines that the synchronization frame is abnormal (when the determination in S204 is "abnormal" or the determination in S203 is "Yes"), the retry possibility determiner 213 determines, based on whether there is time to retry the synchronization process until the timing of synchronization processing during the next period, whether a retry of the synchronization processing is possible (S208). The method of determining whether there is time to retry the synchronization processing is as described above.

Here, if the retry is determined to be impossible (No in S208), the processing proceeds to step S206. On the other hand, upon determining that the retry is possible (Yes in S208), the retry counter 207 increases the number of retries n by one (S209), and the additional transmission requester 214 transmits a retry request to the master device 1 (S210). Afterward, the processing returns to step (S201) of calculating the reception prediction timing of the synchronization frame.

Next, the processing in the master device 1, the processing in the slave device 2 and the flow of signal exchange between the two devices 1 and 2 are described with reference to the charts of FIGS. 7 and 8 in association with the steps illustrated in the above-described flow charts. Due to duplicate descriptions, the descriptions of some of the above-described steps are omitted.

Figure 7:
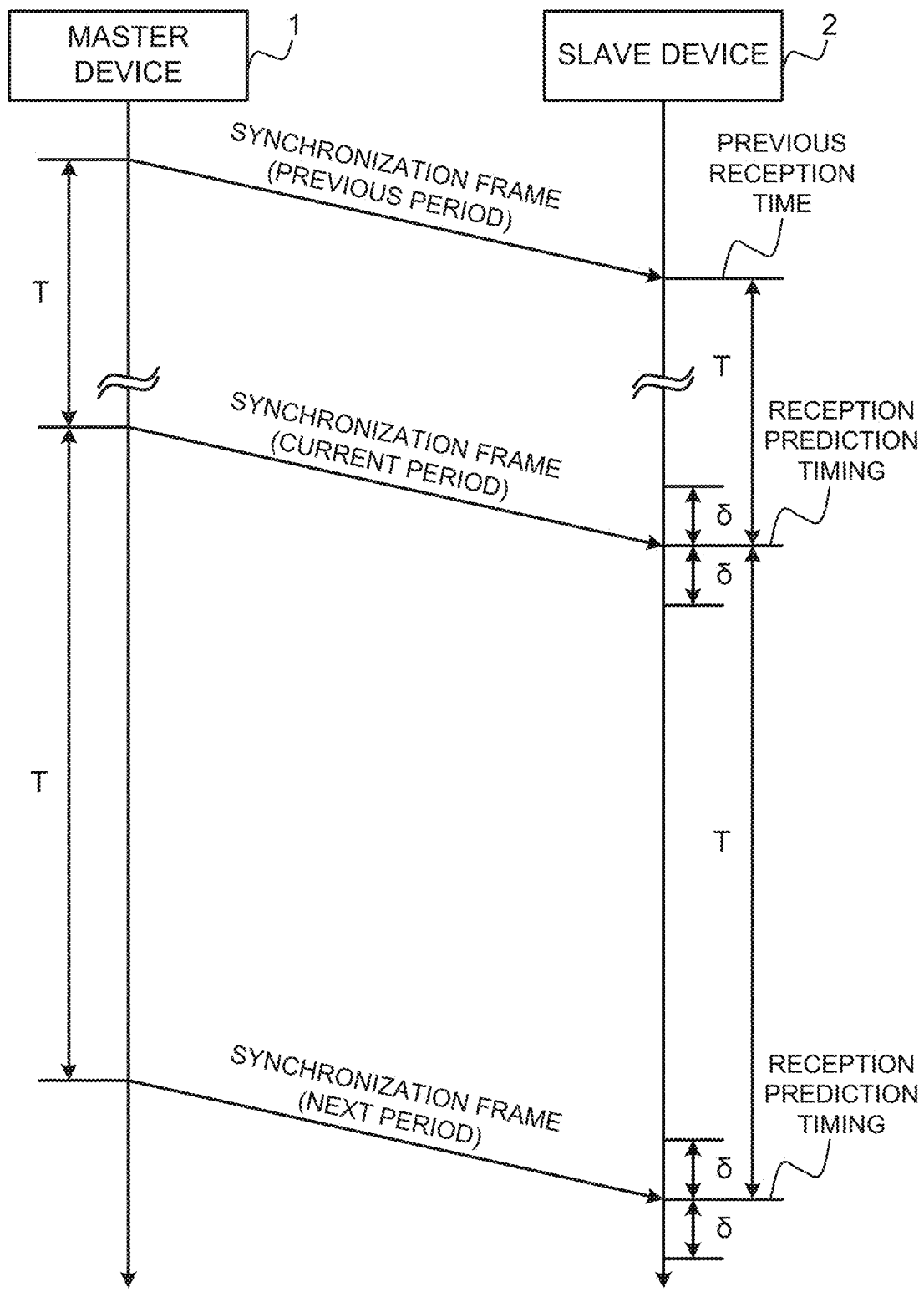
FIG. 7 is a sequence diagram illustrating a flow of communication between the communication devices according to the embodiment of the present disclosure.

FIG. 7 is a sequence diagram illustrating a case in which a synchronization signal is normally transmitted and received between the master device 1 and the slave device 2.

First, the master device 1 transmits a synchronization frame to the slave device 2 (S101), and the slave device 2 receives the synchronization frame (S202). Before receiving the synchronization frame, the slave device 2 calculates the reception prediction timing of the synchronization frame based on a time (previous reception time) of reception of the synchronization frame during a previous period and the synchronization period T (S201). Upon receiving the synchronization frame, the slave device 2 determines the received synchronization frame (S204). Here, the slave device 2 receives the synchronization frame during a period from a time earlier than the reception prediction timing by the allowable difference δ to a time later than the reception prediction timing of the reception by the allowable difference δ, and the synchronization frame received by the slave device 2 is determined to be normal. Since the synchronization frame is determined to be normal, the slave device 2 performs the synchronization processing (S205), and calculates the reception prediction timing of the synchronization frame during the next period (S201). Here, since the synchronization frame is determined to be normal, the slave device 2 does not transmit a retry request to the master device 1. Accordingly, since the retry request is not transmitted, after the synchronization period T elapses from the time of the transmission of the synchronization frame, the master device 1 transmits a synchronization frame during the next period (S101), and the slave device 2 moves on to processing of the synchronization frame transmitted during the next period.

Figure 8:
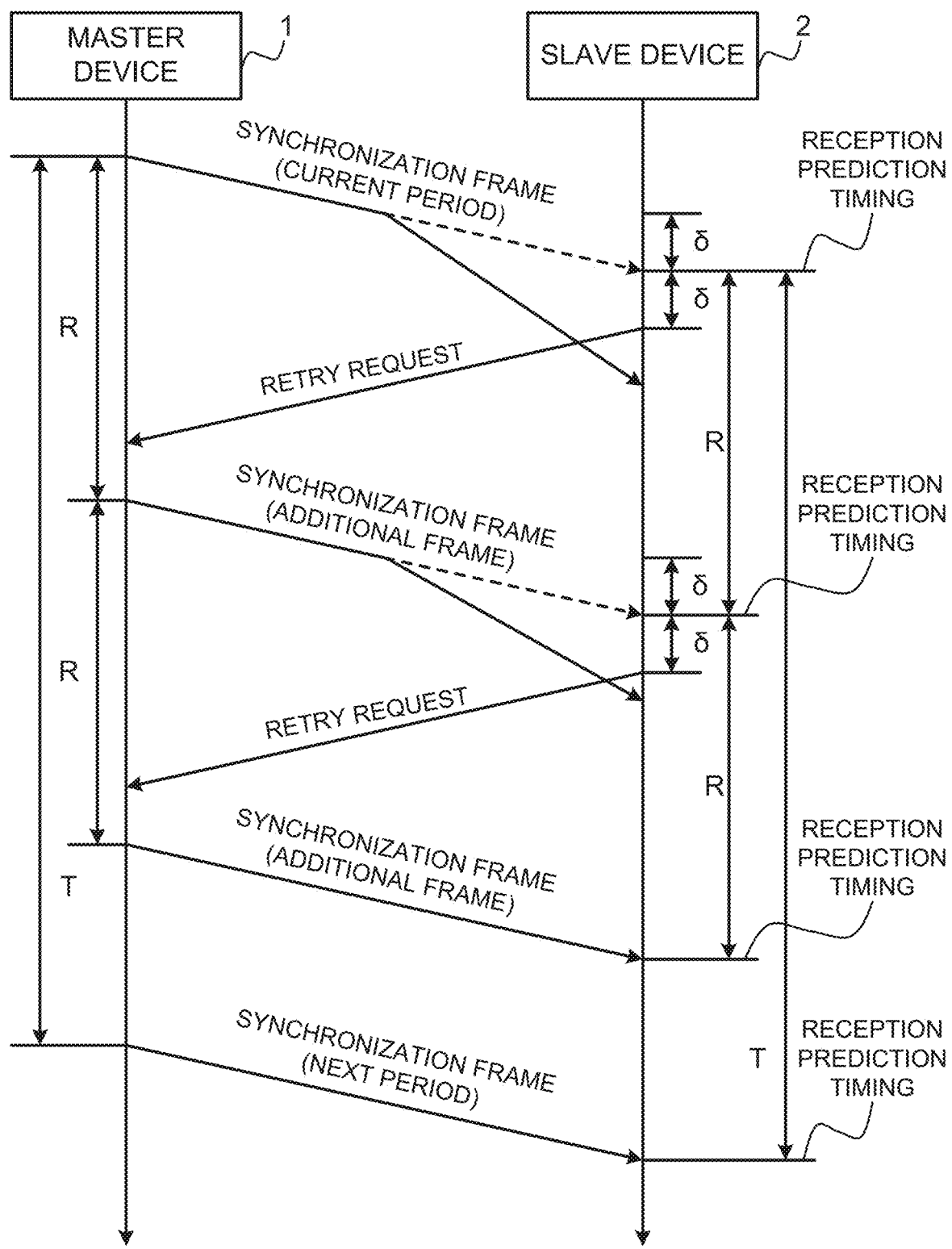
FIG. 8 is a sequence diagram illustrating a flow of communication between the communication devices according to the embodiment of the present disclosure.

FIG. 8 is a sequence diagram illustrating a case in which a delay occurs in communication of a synchronization signal between the master device 1 and the slave device 2 and the synchronization signal is not normally transmitted and received.

As in the case illustrated in FIG. 7, first, the master device 1 transmits a synchronization frame to the slave device 2 (S101), while the slave device 2 calculates, in advance, the reception prediction timing of the synchronization frame (S201). Here, due to the communication delay of the synchronization frame, the slave device 2 is not able to receive the synchronization frame during a period from the reception prediction timing to a time after the elapse of a period equal to the allowable difference δ (Yes in S203). Accordingly, the slave device 2 (i) considers an abnormality to occur in the synchronization frame, (ii) does not execute the synchronization process, and (iii) after the determination of whether there is a time to retry the synchronization processing (S208), transmits a retry request to the master device 1 (S210). Also, the slave device 2 calculates the reception prediction timing of a synchronization frame for a retry (S201). Upon receiving the retry request (S104), the master device 1 transmits the synchronization frame for a retry after a time period equal to the wait interval R elapses from the time of the transmission of the synchronization frame during the same period before transmitting a synchronization frame during the next period (S101), and the slave device 2 moves on to processing of the synchronization frame for a retry. In the case illustrated in FIG. 8, a delay also occurs in the synchronization frame for the first retry, and a request for a second retry is made. After a time period equal to the synchronization period T elapses from the time of the transmission of the first synchronization frame, the master device 1 transmits the synchronization frame during the next period (S101), and the slave device 2 moves on to processing of the synchronization frame transmitted during the next period.

In the present embodiment, when abnormality such as a delay of the synchronization frame occurs in the synchronization frame, the synchronization processing based on the synchronization frame is not performed, but the synchronization frame can be retried without waiting for the next synchronization period. Accordingly, synchronization can be quickly performed. Also, the slave device calculates the reception prediction timing of the next synchronization period based on (i) the time at which the synchronization frame was normally received last time (previous reception time), (ii) the synchronization period, (iii) the wait interval, and (iv) the number of retries, and can determine whether the synchronization frame is normal or abnormal, thereby easily determining whether the synchronization frame is normal or abnormal and easily improving the synchronization accuracy.

REFERENCE SIGNS LIST

1 Master device
2 Slave device
3 Network
4 Bus
5 Processor
6 Memory
7 Input/output interface
101 Master clock
102 Synchronization period storage
103 Input/output port
104 Synchronization signal transmitter
105 Transmission time storage
106 Additional transmission request receiver
107 Retry counter
108 Wait interval storage
201 Slave clock
202 Input/output port
203 Synchronization signal receiver
204 Synchronization period storage
205 Reception time storage
206 Wait interval storage
207 Retry counter
208 Reception timing predictor
209 Allowable difference storage
210 Synchronization signal determiner
211 Synchronization processor
212 Reception time updater
213 Retry possibility determiner
214 Additional transmission requester

The invention claimed is:

1. A communication device comprising:
a synchronization signal receiver to receive a synchronization signal from a master device that has a reference time and transmits the synchronization signal every synchronization period;
a synchronization signal determiner to determine whether the synchronization signal is normal or abnormal;
a synchronization processor to perform, when the synchronization signal is determined to be normal by the synchronization signal determiner, synchronization processing based on the synchronization signal determined to be normal;
an additional transmission requester to request, when the synchronization signal is determined to be abnormal by the synchronization signal determiner, the master device to additionally transmit the synchronization signal before transmitting the synchronization signal during a next period;
a synchronization period storage to store the synchronization period;
a reception time storage to store a previous reception time that is a time at which the synchronization signal is received, the synchronization signal being transmitted by the master device during a previous period and on a basis of the synchronization period;
a wait interval storage to store a time interval between additional transmissions of the synchronization signal by the master device;
a retry counter to count a number of times that the additional transmission requester requests the master device to additionally transmit the synchronization signal within a current period; and
a reception timing predictor to calculate a prediction timing at which the synchronization signal is received next, by adding, to the previous reception time, the synchronization period and a time obtained by multiplying the time interval by the number of times,
wherein
when a magnitude of a difference between the prediction timing and a timing of reception of the synchronization signal by the synchronization signal receiver is equal to or less than a predetermined reference value, the synchronization signal determiner determines that the synchronization signal is normal.

2. The communication device according to claim 1, further comprising
a retry possibility determiner to, when the synchronization signal is determined to be abnormal by the synchronization signal determiner, determine whether the synchronization signal can be additionally transmitted within the current period.

3. A communication system in which a master device and a slave device are connected via a communication line, wherein
the master device comprises
a master clock to generate a reference time, and
a synchronization signal transmitter to
transmit every synchronization period a synchronization signal causing the slave device to execute synchronization with the reference time, and
perform additional transmission of the synchronization signal before transmission of the synchronization signal during a next period upon receiving a request from the slave device, and
the slave device comprises
a slave clock to generate a slave time,
a synchronization signal receiver to receive the synchronization signal from the master device,
a synchronization signal determiner to determine whether the synchronization signal is normal or abnormal,
a synchronization processor to perform, when the synchronization signal is determined to be normal by the synchronization signal determiner, synchronization processing for synchronizing the slave time with the reference time based on the synchronization signal determined to be normal,
an additional transmission requester to request, when the synchronization signal is determined to be abnormal by the synchronization signal determiner, the master device to additionally transmit the synchronization signal within a current period,
a synchronization period storage to store the synchronization period,
a reception time storage to store a previous reception time that is a time at which the synchronization signal is received, the synchronization signal being transmitted by the master device during a previous period and on a basis of the synchronization period,
a wait interval storage to store a time interval between additional transmissions of the synchronization signal by the master device,
a retry counter to count a number of times that the additional transmission requester requests the master device to additionally transmit the synchronization signal within a current period, and
a reception timing predictor to calculate a prediction timing at which the synchronization signal is received next, by adding, to the previous reception time, the synchronization period and a time obtained by multiplying the time interval by the number of times,
wherein
based on whether a magnitude of a difference between the prediction timing and a timing of reception of the synchronization signal by the synchronization signal receiver is equal to or less than a predetermined reference value, the synchronization signal determiner determines whether the synchronization signal is normal or abnormal.

4. A synchronization control method comprising:
periodically transmitting a synchronization signal by a master device that has a reference time;
receiving the synchronization signal by a slave device;
calculating, by the slave device, a prediction timing at which the synchronization signal is received next, by adding, to a previous reception time, (i) the synchronization period and (ii) a time obtained by multiplying a time interval between additional transmissions of the synchronization signal by the master device by a number of times that the slave device requests the master device to additionally transmit the synchronization signal within a current period, the previous reception time being a time at which the synchronization signal is received, the synchronization signal being transmitted by the master device during a previous period and on a basis of the synchronization period,
determining, based on whether a magnitude of a difference between the prediction timing and a timing at which the synchronization signal is received by the slave device is equal to or less than a predetermined reference value, whether the synchronization signal received by the slave device is normal or abnormal;
upon determining that the synchronization signal is normal, performing synchronization processing by the slave device based on the synchronization signal determined to be normal;
upon determining that the synchronization signal is abnormal, making, by the slave device, a request for the master device to additionally transmit the synchronization signal before transmission of the synchronization signal during a next period; and
additionally transmitting the synchronization signal within a current period by the master device based on the request from the slave device.

5. A communication device comprising:
processing circuitry configured to receive a synchronization signal from a master device that has a reference time and transmits the synchronization signal every synchronization period;
the processing circuitry further configured to determine whether the synchronization signal is normal or abnormal;
the processing circuitry further configured to perform, when the synchronization signal is determined to be normal, synchronization processing based on the synchronization signal determined to be normal;
the processing circuitry further configured to request, when the synchronization signal is determined to be abnormal, the master device to additionally transmit the synchronization signal before transmitting the synchronization signal during a next period;
a first memory to store the synchronization period;
a second memory to store a previous reception time that is a time at which the synchronization signal is received, the synchronization signal being transmitted by the master device during a previous period and on a basis of the synchronization period;
a third memory to store a time interval between additional transmissions of the synchronization signal by the master device;
the processing circuitry further configured to count a number of times that the additional transmission requester requests the master device to additionally transmit the synchronization signal within a current period; and the processing circuitry further configured to calculate a prediction timing at which the synchronization signal is received next, by adding, to the previous reception time, the synchronization period and a time obtained by multiplying the time interval by the number of times, wherein when a magnitude of a difference between the prediction timing and a timing of reception of the synchronization signal is equal to or less than a predetermined reference value, the processing circuitry determines that the synchronization signal is normal.

6. The communication device according to claim 5, wherein the processing circuitry is further configured to, when the synchronization signal is determined to be abnormal, determine whether the synchronization signal can be additionally transmitted within the current period.

7. A communication system in which a master device and a slave device are connected via a communication line, wherein the master device comprises
   a master clock to generate a reference time, and
   master processing circuitry configured to
     transmit every synchronization period a synchronization signal causing the slave device to execute synchronization with the reference time, and
     perform additional transmission of the synchronization signal before transmission of the synchronization signal during a next period upon receiving a request from the slave device, and the slave device comprises
   a slave clock to generate a slave time,
   slave processing circuitry configured to receive the synchronization signal from the master device,
   the slave processing circuitry further configured to determine whether the synchronization signal is normal or abnormal,
   the slave processing circuitry further configured to perform, when the synchronization signal is determined to be normal, synchronization processing for synchronizing the slave time with the reference time based on the synchronization signal determined to be normal,
   the slave processing circuitry further configured to request, when the synchronization signal is determined to be abnormal by the synchronization signal determiner, the master device to additionally transmit the synchronization signal within a current period,
   a first memory storage to store the synchronization period,
   a second memory to store a previous reception time that is a time at which the synchronization signal is received, the synchronization signal being transmitted by the master device during a previous period and on a basis of the synchronization period,
   a third memory to store a time interval between additional transmissions of the synchronization signal by the master device,
   the slave processing circuitry further configured to count a number of times that the additional transmission requester requests the master device to additionally transmit the synchronization signal within a current period, and
   the slave processing circuitry further configured to calculate a prediction timing at which the synchronization signal is received next, by adding, to the previous reception time, the synchronization period and a time obtained by multiplying the time interval by the number of times, wherein
based on whether a magnitude of a difference between the prediction timing and a timing of reception of the synchronization signal is equal to or less than a predetermined reference value, the slave processing circuitry determines whether the synchronization signal is normal or abnormal.

\* \* \* \* \*